Patented Jan. 6, 1942

2,268,814

UNITED STATES PATENT OFFICE 2,268,814

ANTHRAPYRIDONE COMPOUND AND MATERIAL COLORED THEREWITH

Gordon F. Frame, Rochester, N. Y., assignor to Eastman Kodak Company, Rochester, N. Y., a corporation of New Jersey No Drawing. Application September 25, 1940, Serial No. 358,285

12 Claims. (Cl. 260—278)

This invention relates to new anthrapyridone compounds and their application to the art of coloring. I have discovered that the anthrapyridone compounds, containing a member selected from the group consisting of a phenoxy and a naphthoxy group in the 2-position and a phenylamino group in the 4-position of the anthrapyridone nucleus, constitute a valuable class of compounds. Depending upon their structure, the compounds of my invention possess application for the coloration of organic derivatives of cellulose, silk and wool. Coloration can be effected by dyeing, printing, stenciling or like methods. The compounds of my invention also appear to stabilize a foam on their solutions and hence probably lower the surface tension of the dye solutions—a useful property in the dyeing of textiles.

While my invention relates broadly to the dye compounds above defined, it relates more particularly to the anthrapyridone compounds having the general formula:

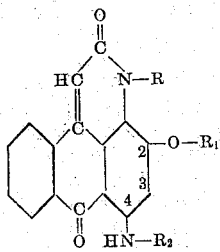

wherein R represents a member selected from the group consisting of hydrogen and an alkyl group and $R_1$ and $R_2$ each represents a phenyl group.

Both sulfonated and non-sulfonated compounds are included within the scope of my invention. The non-sulfonated compounds are particularly of value for the dyeing of organic derivatives of cellulose. These non-sulfonated compounds likewise possess some application for the dyeing of wool and silk. For the dyeing of organic derivatives of cellulose such as cellulose acetate silk, non-sulfonated compounds, wherein the group attached to the 2-position of the anthrapyridone nucleus is a phenoxy nucleus, are generally advantageous.

The nuclear sulfonated compounds of my invention have little or no utility for the coloration of organic derivatives of cellulose but possess application for the dyeing of wool and silk. Preferably, when the dye compounds of my invention are to be employed for the coloration of organic derivatives of cellulose, they should contain no free carboxylic acid group.

It is an object of my invention to provide a new class of anthrapyridone compounds suitable for the coloration of organic derivatives of cellulose, wool and silk. Another object of my invention is to provide a process for the coloration of organic derivatives of cellulose, wool and silk. A further object is to provide colored textile materials which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The anthrapyridone compounds of my invention can be prepared by condensing a 2-bromo-4-phenylamino anthrapyridone or a 2-bromo-4-phenylamino-N-alkylanthrapyridone with phenols and naphthols. The condensation is effected by heating the anthrapyridone compound with an alkali metal salt of the phenol or naphthol in the presence of an excess of the phenol or naphthol. Where sulfonated compounds are desired, the condensation step is followed by sulfonation. The 2 - bromo - 4 - phenylamino-anthrapyridone or the 2-bromo-4-phenylamino-N-alkylanthrapyridone compounds used as the starting materials can be prepared as described in the prior art. A 2-bromo-4-phenylamino-N-methylanthrapyridone is obtainable, for instance, by the procedure outlined in British Patent No. 483,325.

It will be understood that the term "alkyl" as used herein and in the claims, unless otherwise indicated, includes not only unsubstituted alkyl groups such as the methyl group, the ethyl group, a propyl group or a butyl group but also substituted alkyl groups such as β-hydroxyethyl, β-hydroxypropyl, β,γ-dihydroxypropyl, Δ-hydroxybutyl, β-ethoxyethyl, Δ-methoxybutyl, γ-methoxypropyl, β-chloroethyl, γ-chloropropyl, β-hydroethyl, β-cyanoethyl and γ-cyanopropyl. It will be further understood that the terms "a phenyl" and "a naphthyl" group, unless otherwise indicated, include phenyl and naphthyl groups which are unsubstituted or substituted with substituents such as alkyl, hydroxy, alkoxy, halogen, sulfo and carboxy.

The following examples illustrate the preparation of the compounds of my invention:

*Example 1*

A mixture of 4 grams of N-methyl-2-bromo-4-p-toluidinoanthrapyridone (obtainable by condensing N-methyl-2,4-dibromoanthrapyridone with p-toluidine according to the method of German Patent No. 201,904), 40 grams of phenol and 6 grams of sodium hydroxide is heated with stirring at 170–180° C. for four hours under reflux. The product formed is isolated by pouring the reaction mixture into a dilute sodium hydroxide solution sufficient to dissolve the excess phenol present in the reaction mixture. The desired product remains insoluble and can be collected by filtering following which it is washed with water and dried in a vacuum. The product obtained, N-methyl-2-phenoxy-4-p-toluidinoanthrapyridone, is a blue powder and is free of halogen. It melts at 110–115° C. and dissolves in alcohol with a bluish-red color. 3.7 grams or 90% of the theoretical yield is obtained.

3.6 grams of the product obtained above is dissolved in a mixture of 18 grams of concentrated sulfuric acid and 25.8 parts of 20% oleum. The solution resulting is stirred at 35–40° C. for two hours following which the mixture is poured onto ice and the precipitate which is formed is recovered by filtration and washed with a 5% aqueous sodium chloride solution. The precipitate thus obtained is dissolved in a hot dilute sodium hydroxide solution, the solution is filtered and the filtrate treated with a saturated sodium chloride solution. N-methyl-2-sulfophenoxy-4-sulfo-p-toluidinoanthrapyridone is precipitated by this treatment and is collected on a filter and dried. It dissolves readily in cold water with a red color.

In this example the preparation of an unsulfonated anthrapyridone compound and the corresponding sulfonated anthrapyridone compound is described. The unsulfonated compound colors cellulose acetate silk a bluish-red color while the sulfonated compound colors wool and silk a more reddish color.

*Example 2*

A mixture of 4 grams of N-methyl-2-bromo-4-p-toluidinoanthrapyridone, 40 grams of p-cresol and 6 grams of sodium hydroxide is heated with stirring under reflux for four hours at 170–180° C. The reaction mixture is quite fluid on first melting and becomes viscous during the heating. Following the refluxing treatment, the reaction mixture is permitted to cool somewhat and is then poured into a dilute sodium hydroxide solution in which the excess phenol is dissolved. The desired product is insoluble and is recovered by filtration, washed with water, alcohol and ether, and dried. The N-methyl-2-p-cresoxy-4-p-toluidinoanthrapyridone obtained is a bluish-red colored powder dissolving in alcohol with a red color. It does not contain halogen. 3.4 grams or 80.1% of the theoretical yield is obtained. The melting point of the dye is 145–155° C. By sulfonation of the anthrapyridone compound obtained, N-methyl-2-sulfo-p-cresoxy-4-sulfo-p-toluidinoanthrapyridone can be obtained. Sulfonation and recovery of the dye compound can be carried out in accordance with the general method described in Example 1. The sulfonated dye compound is a reddish-powder which dissolves readily in cold water with a bluish-red color.

By the use of an equivalent gram molecular weight of m- and o-cresol for the p-cresol of the example, N-methyl-2-m-cresoxy-4-p-toluidinoanthrapyridone and N-methyl-2-o-cresoxy-4-p-toluidinoanthrapyridone, respectively, can be obtained. These compounds can be sulfonated to obtain N-methyl-2-sulfo-m-cresoxy-4-sulfo-p-toluidinoanthrapyridone and N-methyl-2-sulfo-o-cresoxy-4-sulfo-p-toluidinoanthrapyridone, respectively.

*Example 3*

2.5 grams of N-methyl-2-bromo-4-p-toluidinoanthrapyridone are mixed with 25 grams of p-ethylphenol and 3.7 grams of sodium hydroxide and the reaction mixture is heated with stirring under reflux at 160–170° C. for three and one-half hours. While still warm, the reaction mixture is poured into a dilute sodium hydroxide solution sufficient to dissolve any free p-ethylphenol and filtered. The product obtained which is N-methyl-2-p-ethylphenoxy-4-p-toluidinoanthrapyridone is washed with water and dried. The product obtained is a reddish-powder which does not contain halogen. It is quite soluble in alcohol, dissolving therein with a red color. 2.3 grams or 84% of the theoretical yield is obtained.

By the substitution of equivalent gram molecular weights of 2-bromo-4-p-toluidinoanthrapyridone, N-β-methoxyethyl-2-bromo-4-p-toluidinoanthrapyridone, N-ethyl-2-bromo-4-p-toluidinoanthrapyridone and N-methyl-2-bromo-4-phenylaminoanthrapyridone for the N-methyl-2-bromo-4-p-toluidinoanthrapyridone of the example, 2-p-ethylphenoxy-4-p-toluidinoanthrapyridone, N-β-methoxyethyl-2-p-ethylphenoxy-4-p-toluidinoanthrapyridone, N-ethyl-2-p-ethylphenoxy-4-p-toluidinoanthrapyridone and N-methyl-2-p-ethylphenoxy-4-phenylaminoanthrapyridone, respectively, can be obtained. Similarly, if 2.7 grams of N-β-hydroxyethyl-2-bromo-4-p-toluidinoanthrapyridone is reacted with 25 grams of p-cresol in accordance with the example, N-β-hydroxyethyl-2-p-cresoxy-4-p-toluidinoanthrapyridone is obtained.

By sulfonation of the anthrapyridone compounds obtained as described or indicated above, anthrapyridone compounds sulfonated in both the phenyl groups present in the 2- and 4-positions are obtained. Sulfonation and recovery of the dye compounds can be carried out in accordance with the general method described in Example 1. To illustrate, by sulfonation of N-methyl-2-p-ethylphenoxy-4-p-toluidinoanthrapyridone, the sulfonated dye, N-methyl-2-sulfo-p-ethylphenoxy-4-sulfo-p-toluidinoanthrapyridone is obtained. This dye is a red powder which dissolves easily in cold water with a bluish-red color. The unsulfonated dye colors cellulose acetate silk bluish-red whereas the sulfonated dye colors wool and silk a similar color.

By the use of an equivalent gram molecular weight of m-ethylphenol and o-ethylphenol for p-ethylphenol, anthrapyridone dyes corresponding to those above described but containing an m-ethylphenoxy or o-ethylphenoxy group in the 2-position are obtained.

*Example 4*

2.4 grams of N-methyl-2-bromo-4-p-toluidinoanthrapyridone, 24 grams of thymol and 3.5 grams of sodium hydroxide are heated together with stirring at 160–170° C. for 3½ hours. While still warm, the reaction mixture is poured into a dilute sodium hydroxide solution sufficient to dissolve any free thymol and filtered. The product obtained, which is N-methyl-2-(2'-iso-propyl-5'-methyl)-phenoxy-4-p-toluidinoanthrapyridone, is washed with water and dried. The product obtained does not contain halogen and dissolves in alcohol with a scarlet color. 1.9 grams or 68.5% of the theoretical yield is obtained. This dye compound colors cellulose acetate silk a scarlet color.

By sulfonation of the anthrapyridone compound obtained, N-methyl-2-sulfo-(2'-isopropyl-5'-methyl)-phenoxy-4-sulfo-p-toluidinoanthrapyridone can be obtained. Sulfonation and recovery of the dye compound can be carried out in accordance with the general procedure described in Example 1. The sulfonated dye compound is red and dissolves in water with a scarlet color. It colors wool and silk scarlet.

Example 5

A mixture of 2.5 grams of N-methyl-2-bromo-4-p-toluidinoanthrapyridone, 25 grams of β-naphthol and 3.7 grams of sodium hydroxide is heated with stirring under reflux for 3½ hours at 160–170° C. While still warm, the reaction mixture is poured into a dilute sodium hydroxide solution sufficient to dissolve any free β-naphthol and filtered. The product obtained, which is N-methyl-2-β-naphthoxy-4-p-toluidinoanthrapyridone, is washed with water and dried. The dye product is free from halogen and is soluble in alcohol dissolving therein with a yellowish-red color. This dye compound colors cellulose acetate silk yellowish-red.

By sulfonation of the anthrapyridone compound obtained, N-methyl-2-sulfo-β-naphthoxy-4-sulfo-p-toluidinoanthrapyridone can be obtained. Sulfonation and recovery of the dye compound can be carried out in accordance with the general method described in Example 1. The sulfonated dye compound dissolves in cold water with a brownish-red color and colors wool and silk a similar color.

N-β,γ-dihydroxypropyl-2-bromo-4-p-toluidino anthrapyridone, N-β-sulfoethyl-2-bromo-4-toluidino anthrapyridone, 2-bromo-4-p-toluidino anthrapyridone and N-methyl-2-bromo-4-o-toluidino anthrapyridone, for example, can be substituted for the anthrapyridone compound of the example to obtain corresponding anthrapyridone compounds wherein the bromine atom in the 2-position is replaced by β-naphthol. These compounds can be sulfonated to yield the corresponding sulfonated dyes. By the substitution of an equivalent gram molecular weight of α-naphthol for β-naphthol, the corresponding unsulfonated and sulfonated anthrapyridone compounds can be obtained; that is, the β-naphthol group is replaced by α-naphthol.

It will be understood that the examples are intended to be illustrative and not limitative of my invention as numerous other anthrapyridone compounds included within the scope of my invention can be prepared. The unsulfonated compounds color organic derivatives of cellulose, such as cellulose acetate silk, the colors indicated in the examples. The sulfonated compounds color wool and silk substantially the same color as the corresponding unsulfonated compounds color cellulose acetate silk.

The compounds of my invention can be employed for the coloration of organic derivatives of cellulose, wool and silk by well known methods employed for coloring these materials. In the case of wool and silk the dye can be dissolved in water, the material added and dyeing carried out at a temperature of 70–85° C. until complete. For the dyeing of cellulose acetate silk, the dye can be ground to a fine powder, intimately mixed with a solubilizing or dispersing agent such as soap or a sulfonated oil such as sulfonated castor oil, and added to water to form a dyebath. Following this, the dyebath can be heated to 30–35° C., the cellulose acetate material to be dyed added, the temperature of the dyebath raised to 75–85° C. and maintained at this temperature until dyeing is complete. The amount of dye to be employed varies, depending upon the depth of shade desired. Amounts ranging from 1 to 3% by weight, based on the weight of the cloth, are ordinarily employed.

I claim:

1. Anthrapyridone compounds selected from the group consisting of sulfonated and unsulfonated anthrapyridone compounds containing a member selected from the group consisting of hydrogen and an alkyl group in the 1-position, a member selected from the group consisting of a phenoxy and a naphthoxy group in the 2-position and a phenylamino group in the 4-position of the anthrapyridone nucleus, said anthrapyridone compounds containing no other substituents in addition to those specified above.

2. Unsulfonated anthrapyridone compounds containing a member selected from the group consisting of hydrogen and an alkyl group in the 1-position, a member selected from the group consisting of a phenoxy and a naphthoxy group in the 2-position and a phenylamino group in the 4-position of the anthrapyridone nucleus, said anthrapyridone compounds containing no other substituents in addition to those specified above.

3. An anthrapyridone compound having the formula:

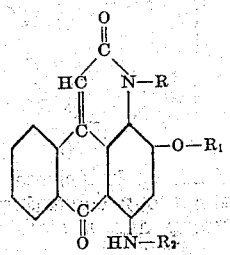

wherein R represents a member selected from the group consisting of hydrogen and an alkyl group, $R_1$ represents a member selected from the group consisting of a phenyl and a naphthyl group and $R_2$ represents a phenyl group.

4. An anthrapyridone compound having the formula:

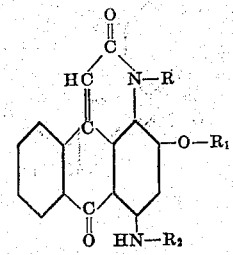

wherein R represents a member selected from the group consisting of hydrogen and an alkyl group and $R_1$ and $R_2$ each represents a phenyl group.

5. An anthrapyridone compound having the formula:

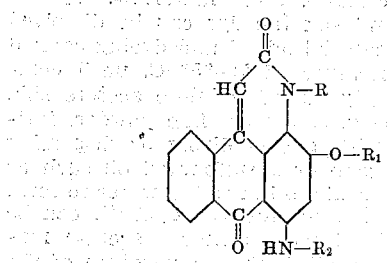

wherein R represents a member selected from the group consisting of hydrogen and an alkyl group and $R_1$ and $R_2$ each represents a phenyl group, substituted with at least one alkyl group.

6. An anthrapyridone compound having the formula:

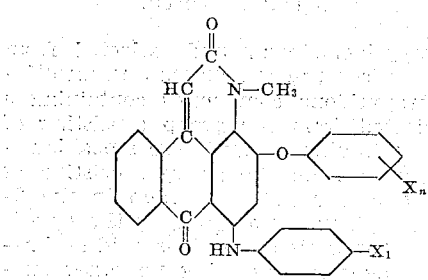

wherein X and $X_1$ each represents a member selected from the group consisting of hydrogen and an alkyl group and $n$ stands for a small whole positive number.

7. An anthrapyridone compound having the formula:

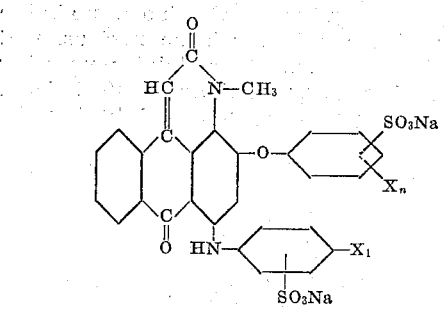

wherein X and $X_1$ each represents a member selected from the group consisting of hydrogen and an alkyl group and $n$ stands for a small whole positive number.

8. The anthrapyridone compound having the formula:

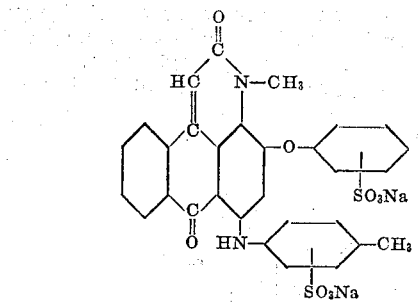

9. The anthrapyridone compound having the formula:

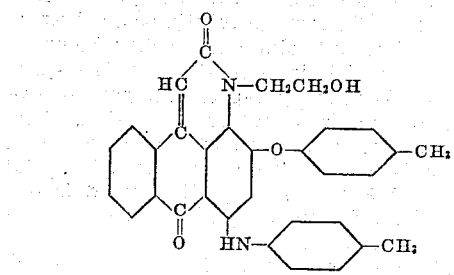

10. Textile material colored with an anthrapyridone compound having the formula:

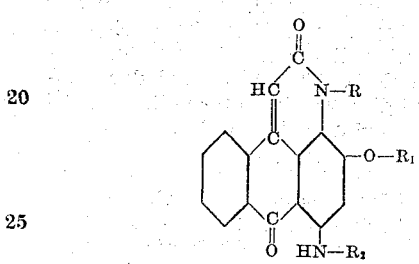

wherein R represents a member selected from the group consisting of hydrogen and an alkyl group, $R_1$ represents a member selected from the group consisting of a phenyl and a naphthyl group and $R_2$ represents a phenyl group.

11. A textile material colored with an anthrapyridone compound having the general formula:

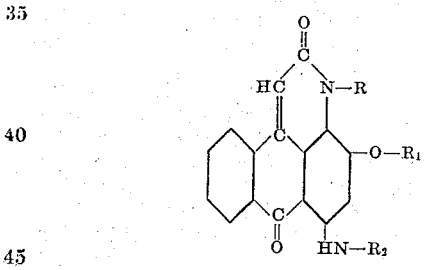

wherein R represents a member selected from the group consisting of hydrogen and an alkyl group and $R_1$ and $R_2$ each represents a phenyl group.

12. A cellulose acetate colored with a non-sulfonated anthrapyridone compound having the general formula:

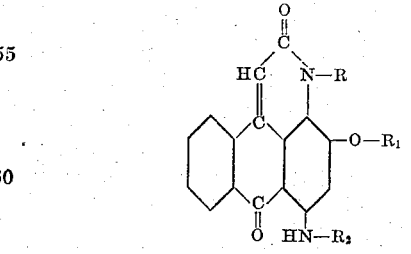

wherein R represents a member selected from the group consisting of hydrogen and an alkyl group and $R_1$ and $R_2$ each represents a phenyl group.

GORDON F. FRAME.